United States Patent [19]
Navetta

[11] Patent Number: 5,569,154
[45] Date of Patent: Oct. 29, 1996

[54] METHOD AND APPARATUS FOR REMOVING MERCURY FROM MERCURY-CONTAMINATED SOILS

[76] Inventor: Michael S. Navetta, 1216 Harper Pl., Knoxville, Tenn. 37922

[21] Appl. No.: 490,129

[22] Filed: Jun. 14, 1995

[51] Int. Cl.$^6$ .................................................. C22B 43/00
[52] U.S. Cl. ............................ 588/256; 405/128; 75/670
[58] Field of Search .......................... 588/256; 405/128; 75/670

[56] References Cited

U.S. PATENT DOCUMENTS 5,209,604  5/1993  Chou ........................................ 405/128
5,300,137  4/1994  Weyand et al. ............................ 75/670

Primary Examiner—William P. Neuder
Attorney, Agent, or Firm—Richard M. Kessler

[57] ABSTRACT

A method for the removal of mercury from soil, wherein the soil has been contaminated with mercury. The method comprises the following steps. Soil is added to one end of an internally fired hollow screw desorber under a vacuum in the range of from about 15 inches of mercury to about 30 inches of mercury. The soil is moved from the one end of the internally fired hollow screw desorber to another end of the desorber and the temperature of the soil is increased in the desorber as it moves from the one end of the desorber to the other end, wherein the temperature of the soil is increased from a temperature in the range of from about ambient to about 150° F. to a temperature in the range of from about 800° F, to about 1500° F. A mercury vapor is produced in the internally fired hollow screw desorber. The soil is removed from the other end of the desorber while the mercury vapor is removed from the internally fired hollow screw desorber. Mercury is then recovered from the mercury vapor.

7 Claims, 2 Drawing Sheets

METHOD AND APPARATUS FOR REMOVING MERCURY FROM MERCURY-CONTAMINATED SOILS

FIELD OF THE INVENTION

The present invention relates to methods and apparatus for the removal of material from contaminated soils and industrial wastes. More specifically, the present invention relates to a method and apparatus for removing mercury from mercury-contaminated soils and industrial wastes.

BACKGROUND OF THE INVENTION

The disposal of soils and industrial wastes contaminated with mercury or mercury compounds has created major environmental and economic problems for U.S. industries. The U.S. Environmental Protection Agency (EPA) has classified any industrial waste product having a leachable mercury content of 0.2 parts per million (ppm) or higher (as measured by the standard EPA TCLP Leach Test) as hazardous waste that must be disposed of in a secure hazardous waste land disposal facility. In addition, many state environmental regulatory agencies are requiring that soils contaminated with mercury must be treated to reduce the mercury content to levels equivalent to the background levels that existed in the soils prior to contamination before the treated soils can be disposed of or used as land fill material.

The relatively low mercury content and large volume of inert materials in contaminated soils and industrial wastes make economic recovery of the contained mercury difficult and the disposal of the contaminated waste extremely costly. As a result, there is a need for a method and apparatus for removing mercury form soils and industrial wastes. Such method and apparatus must reduce the mercury content of the soils and industrial wastes to at least the background level, must reduce the mercury content of the soils and industrial wastes to 0.2 ppm or less and must recover the removed mercury in usable form in order to recover some economic value and breaking the chain of liability inherent in the disposal of mercury-containing wastes classified as hazardous by the EPA.

Mercury contamination of soil is especially acute in the areas of metering station sites along natural gas pipelines where, for over a quarter of a century, metallic mercury was routinely discharged onto the ground each time the mercury used in flow measuring devices was replaced or upon the failure of the devices. These contaminated sites are characterized by relatively low concentrations of mercury (from about 100 ppm to about 2,000 ppm). These sites also have substantial variations in soil constituents (such as clay minerals, iron and/or manganese oxides and hydroxides, gypsum, jarosite, quartz, carbonates, organic and carbonaceous materials and the like). Further, the mercury is present in a wide variety of forms (such metallic mercury, mercury oxides and sulfides, methyl mercury and the like). These site characteristics, individually and collectively, have previously prevented the efficient, complete and economic removal of the mercury contamination from the soil at these sites.

The efficient and economical decontamination of such sites requires a mercury removal process that is capable of processing soils that vary substantially in type and composition, and, simultaneously, removes the wide variety of forms of mercury that may exist in the soil. Such a system should reduce the mercury content of the treated soil to the background level of mercury (usually less than about 1 ppm) normally present in that particular soil. The process should also permit recovery of the removed mercury in a reusable form. The equipment associated with method should be sufficiently portable to be economically moved from site to site, thereby elimination the need to transport large volumes of soil to a remote treatment facility in order to remove the mercury from the soil.

Similar problems are encountered when treating mercury-containing industrial and incinerator wastes which also vary greatly in mineral form and composition from site to site, contain relatively small amounts of mercury and are located over a wide geographic area in quantities too small to permit the economic recovery of the mercury contained therein.

Current methods and techniques for stabilizing and encapsulating mercury species contained in soils and industrial wastes are capable of significantly reducing the leachablility of mercury from those soils and wastes but at the cost of greatly increasing the volume of the materials requiring disposal. In addition, the current methods and techniques do not reduce the mercury content of the treated product and thereby extend the chain of environmental liability related to the disposal or reuse of the treated soils or wastes.

None of the prior art methods or apparatus are adaptable to the economical, on-site reduction of the leachable content of mercury in the mercury-contaminated soils and industrial wastes. Nor do the methods or apparatus convert mercury-contaminated materials classified as "hazardous waste" to materials classified as "non-hazardous waste." Further, none of the prior art methods or apparatus recover the removed mercury in a usable form thereby ending the environmental liability related to treated soils or wastes.

There remains, therefore, a need for a practical method of (a) economically removing mercury from contaminated soils and industrial wastes that vary greatly in composition, physical form, and the species of mercury contained therein; (b) on-site conversion of mercury-containing soils and industrial wastes classified as "hazardous" to conversion products classified as "non-hazardous" by the removal of the mercury therefrom; (c) recovering the removed mercury in usable form; and (d) thermally treating the mercury-containing soils and industrial wastes in a manner that permits control of the mercury, sulfur, dust, and organic contents of the gaseous process effluent to a degree that the effluent is considered harmless to environment and to persons practicing the method. Such a system incorporating these improvements would substantially reduce the cost of treating mercury-contaminated soils and industrial wastes and greatly reduce the environmental dangers inherent therein.

It is, therefore, an object of the present invention to provide a method and apparatus for removing mercury and mercury compounds from mercury-contaminated soils and industrial wastes.

It is another object of the present invention to provide such a system that reduces the mercury content of mercury-contaminated soils to a level no greater than the background level of mercury contained in the soil prior to the contamination.

It is a further object of this invention to reduce the leachable mercury content of mercury-containing industrial wastes to a level of less than about 0.2 ppm as measured by the standard EPA TCLP Leach Test.

It is yet another object of this invention to minimize the content of gaseous sulfur compounds generated during the thermal treatment of mercury-contaminated soils and industrial wastes.

It is also an object of the present invention to maximize the amount of elemental mercury recovered during the thermal treatment of mercury-contaminated soils and industrial wastes.

It is yet another object of the present invention to provide a transportable means of thermally treating mercury-contaminated soils and industrial wastes such that the means may be economically and efficiently transported to various sites at which the mercury-contaminated soils and industrial wastes are located.

Consideration of the specification, including the several figures to follow, will enable one skilled in the art to determine additional objects and advantages of the invention.

SUMMARY OF THE INVENTION

Having regard to the above and other objects and advantages, the present invention generally provides for a method for the removal of mercury from soil, wherein the soil has been contaminated with mercury. The method comprises the following steps. Soil is added to one end of an internally fired hollow screw desorber under a vacuum in the range of from about 15 inches of mercury to about 30 inches of mercury. The soil is moved from the one end of the internally fired hollow screw desorber to another end of the desorber and the temperature of the soil is increased in the desorber as it moves from the one end of the desorber to the other end, wherein the temperature of the soil is increased from a temperature in the range of from about ambient to about 150° F. to a temperature in the range of from about 800° F. to about 1500° F. A mercury vapor is produced in the internally fired hollow screw desorber. The soil is removed from the other end of the desorber while the mercury vapor is removed from the internally fired hollow screw desorber. Mercury is then recovered from the mercury vapor.

In a preferred embodiment of the invention, the soil is added to the internally fired hollow screw desorber through an airlock valve and the soil is removed from the internally fired hollow screw desorber through another airlock valve.

It is further preferred that the step of recovering mercury from the mercury vapor further includes passing the mercury vapor through a condenser at a temperature in the range of from about 40° F. to about 60° F. producing a mercury-rich condensate, passing the mercury-rich condensate through a gravimetric mercury separator, and removing the mercury from the gravimetric mercury separator.

The present invention also provides for an apparatus for removing mercury from soil, wherein the soil has been contaminated with mercury. The apparatus comprises an internally fired hollow screw desorber, a condenser for condensing materials from the vapors removed from the interior of the exterior casing of the internally fired hollow screw desorber, a first conduit for transferring the vapors removed from the interior of the exterior casing of the internally fired hollow screw desorber to the condenser, a trap for separating the mercury from the condensed materials condensed in the condenser, a second conduit for transferring the condensed material from the condenser to the trap, and a mobile platform for bearing the desorber, the condenser, the first conduit, the trap, and the second conduit in a manner such that the desorber, the condenser, the first conduit, the trap, and the second conduit are capable of acting in concert to remove mercury from the soil.

The internally fired hollow screw desorber further includes an external casing having a first end and a second end opposite the first end, and having a closed shell connecting the first end and the second end, wherein the external casing is capable of sustaining an internal vacuum in the range of from about 15 inches of mercury to about 30 inches of mercury. The desorber also includes a hollow spindle mounted axial to the external casing, running from the first end to the second end of the external casing, a burner providing a flame into the hollow spindle adjacent the second end of the external casing wherein the flame travels at least a portion of the length of the hollow spindle, a screw transport mechanism mounted to the hollow spindle internal to and axial to the external casing, the screw transport mechanism for transporting soil from the first end to the second end, a first airlock valve in the external casing adjacent the first end for passing soil from outside the external casing to inside the external casing, the first airlock valve being capable of passing the soil without substantial loss of vacuum inside the external casing, a second airlock valve in the external casing adjacent the second end for passing soil from inside the external casing to outside the external casing, the second airlock valve being capable of passing the soil without substantial loss of vacuum inside the external casing, and a vapor port adjacent the second end of the external casing for removing vapors from the interior of the external casing.

In a preferred embodiment of the present invention, the internally fired hollow screw desorber further includes a second vapor port between the first airlock valve and the vapor port for removing vapors from the desorber. A preferred embodiment of the present invention also includes a second condenser for condensing steam vapor from the desorber, and a third conduit for transporting the steam vapor from the second vapor port to the second condenser.

BRIEF DESCRIPTION OF THE DRAWINGS

The above and other features and advantages of the invention will become further known from the following detailed description of preferred embodiments of the invention in conjunction with the drawings in which.

DETAILED DESCRIPTION OF THE DRAWINGS

Figure 1:
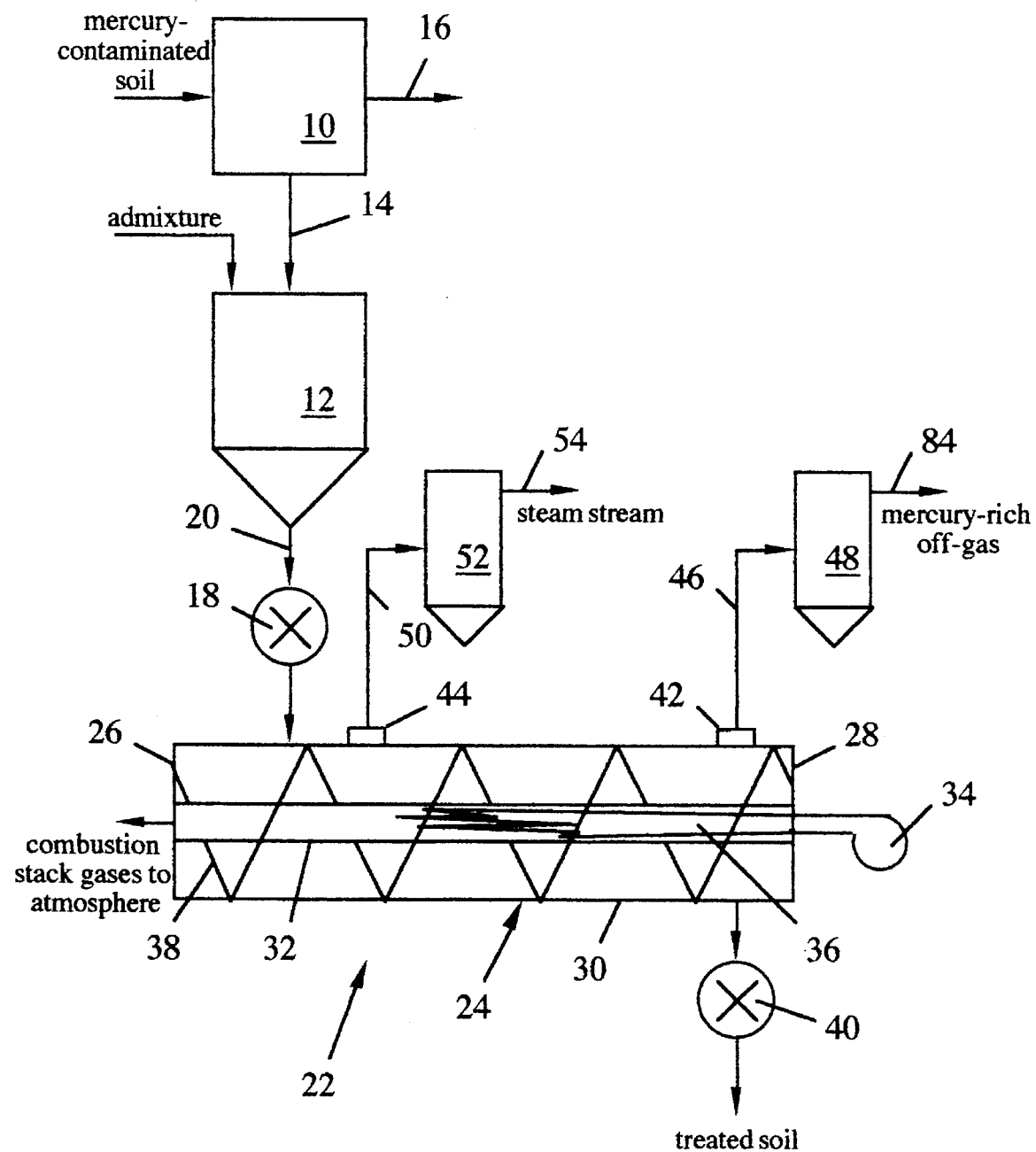
FIG. 1 is a schematic drawing of an apparatus according to the present invention showing the initial processing of the mercury-contaminated soil or industrial waste in the internally fired hollow screw desorber.

Referring now to the drawings in which like reference characters designate like or corresponding parts throughout the several views, FIG. 1 shows a schematic drawing of an apparatus according to the present invention showing the initial processing of the mercury-contaminated soil or industrial waste in the internally fired hollow screw desorber. In the practice of the invention, mercury-contaminated soil is processed in a soil screener 10 (also known as a grizzly). The size reduced or screened soil from the screener 10 is transferred to a soil feed hopper 12 through a conduit 14. A conduit 16 removes the large rock and debris from the screener 12 for separate disposal or further processing.

Soil from the soil feed hopper 12 is mixed with an admixture material for minimizing scaling on the heat transfer surfaces of the apparatus and neutralizes acid gases produced by the oxidation of halogenated substances in the soil. Those skilled in the art will appreciated that the admixture material employed will be any one of a number of well known compounds and mixtures of compounds such as limestone, hydrated lime, lime, or cement kiln dust, for example and other metallic compounds such as oxides and/or hydroxides of sodium, potassium, calcium, barium and magnesium.

The soil and admixture material is transferred from the feed hopper 12 to an airlock valve 18, such as a rotary airlock valve or a triple dump valve, both of which are well known in the art, through a conduit 20. The soil and admixture material is metered through the airlock valve 18 into one end of an internally fired hollow screw desorber 22.

The internally fired hollow screw desorber 22 is similar to a horizontal ribbon-screw reactor used in metallurgical applications. The desorber 22 includes an external casing 24 having a first end 26 and a second end 28 opposite the first end 26, and having a closed shell 30 connecting the first end 26 and the second end 28.

The external casing 24 is capable of sustaining an internal vacuum in the range of from about 20 inches of mercury to about 30 inches of mercury. The desorber 22 also includes a hollow spindle 32 mounted axial to the external casing 24, running from the first end 26 to the second end 28 of the external casing 24.

There is also a burner 34 providing a flame 36 into the hollow spindle 32 adjacent the second end 28 of the external casing 24. The flame 36 from the burner 34 travels at least a portion of the length of the hollow spindle 32.

The desorber 22 further includes a screw transport mechanism 38 mounted to the hollow spindle 32 internal to and axial to the external casing 24. The screw transport mechanism 38 transports the soil and admixture material from the first end 26 to the second end 28 of the external casing 24.

The first airlock valve 18 is capable of passing the soil and admixture material from the conduit 20 to the interior of the desorber 22 without substantial loss of vacuum inside the external casing 24. There is a second airlock valve 40 in the external casing 24 adjacent the second end 28 for passing soil from inside the external casing 24 to outside the external casing 24 without substantial loss of vacuum inside the external casing 24.

The desorber 22 also includes a vapor port 42 through the external casing 24 and adjacent the second end 28 of the external casing 24 for removing mercury-containing vapors from the interior of the external casing 24. There is also a second vapor port 44 through the external casing 24 between the first vapor port 42 and the first airlock 18 for removing steam vapor from the interior of the external casing 24. A conduit 46 connects the first vapor port 42 to a cyclone cleaner 48 and another conduit 50 connects the second vapor port 44 to a second cyclone cleaner 52.

During operation of the apparatus illustrated in FIG. 1 according to the present invention, the soil and admixture material is metered into the desorber 22 through the first airlock 18. The use of the airlock 18 allows the continuous processing of soil through the desorber 22. From the airlock 18 the soil and admixture material is deposited in the cool end of the desorber 22. As the soil and admixture material enter the cool end of the desorber 22 and begins to travel the length of the desorber 22, it is incrementally heated. In the cool end of the desorber 22, the temperature of the soil and admixture material is elevated past the boiling point of water (for example, 134° F. at a vacuum of 25 inches of mercury).

Significant quantities of steam are produced as moisture within the soil matrix is vaporized. This steam stream, consisting of water vapor, particulates and air, is pulled, under vacuum, from the desorber 22 through the second vapor port 44 and through the conduit 50 to the second cyclone 52. The entrained soil particles are removed from the steam stream by the second cyclone 52 and the remainder of the steam stream is transferred to a condenser system more fully described hereinbelow with respect to FIG. 2.

The dewatered soil is moved by the screw transport mechanism 38 along the length of the desorber 22 toward the burner 34. As the soil moves along the length of the desorber 22, its temperature increases to the treatment end point of in the range of from about 800° F. to about 1500° F. Mercury and other volatile metals begin to desorb from the soil at relatively low temperatures (a few hundred degrees F.). At moderate temperatures (from about 500° F. to about 900° F.), naturally occurring organic compounds in the soil also desorb and decompose. As the soil approaches the burner 34, its temperature rises to the range of from about 800° F. to about 1500° F. where even the most stable mercury compounds completely desorb.

The off-gas, containing mercury vapor, from the hot end (second end 28) of the desorber 22 is pulled, under vacuum, from the desorber 22 through the first vapor port 42 and the conduit 46 to the first cyclone cleaner 48. Any remaining particles are removed and the vapor is transferred to a condenser system more fully described hereinbelow with respect to FIG. 2.

The treated soil is discharged from the desorber 22 through the second airlock 40 and is allowed to cool prior to being moved to a final disposal site.

Thus, the apparatus according to the present invention, as shown in FIG. 1, processes mercury-contaminated soil in a continuous fashion to produce soil with a much lowered level of mercury. The vapors from the desorber are further processed as is shown in FIG. 2.

Figure 2:
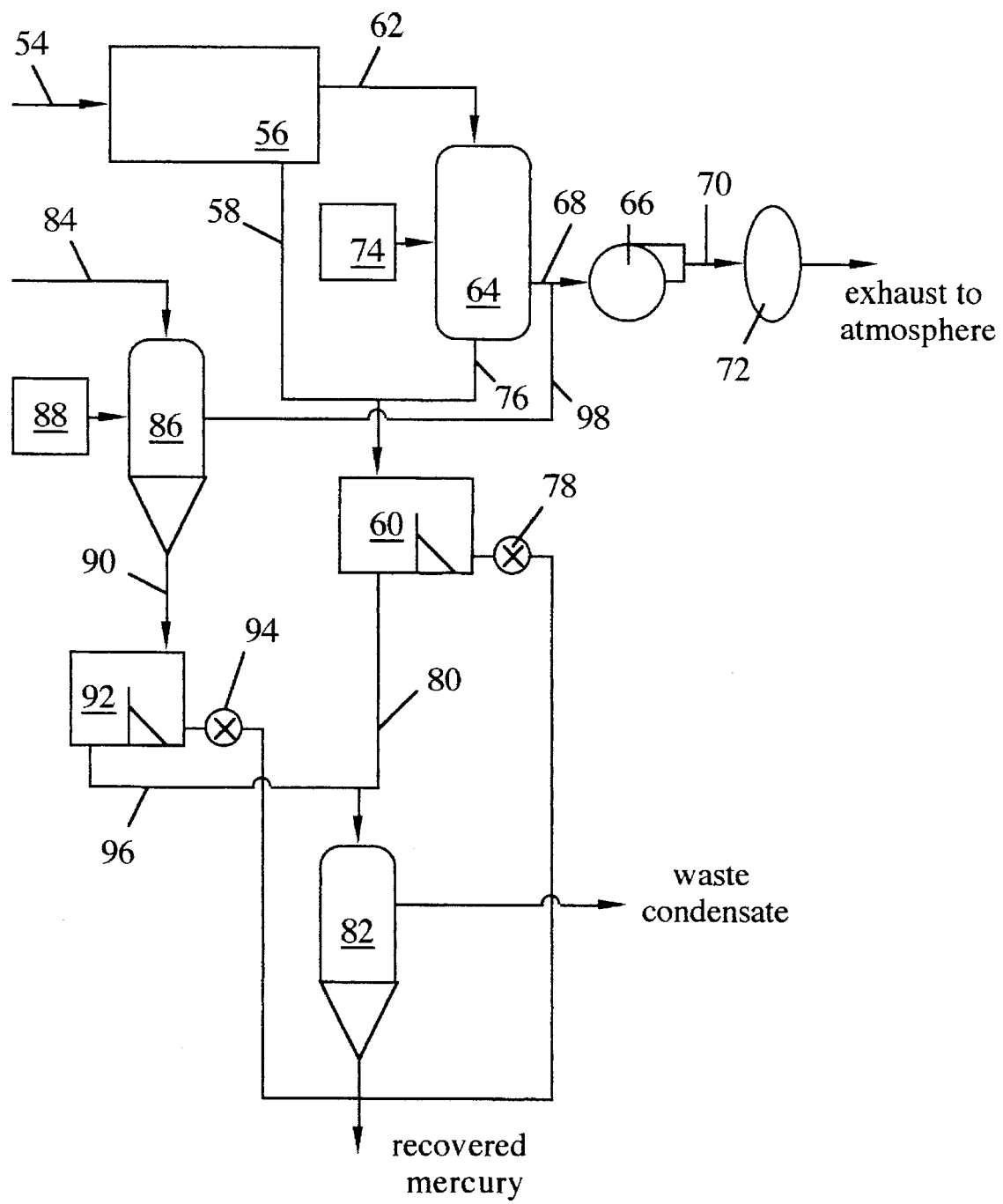
FIG. 2 is a schematic drawing of an apparatus according to the present invention showing the processing of the vapors generated by the internally fired hollow screw desorber shown in FIG. 1.

There is shown in FIG. 2 a schematic drawing of an apparatus according to the present invention showing the processing of the vapors generated by the internally fired hollow screw desorber shown in FIG. 1. The steam-rich off-gas from the cool end (first end 26) of the desorber 22 is transferred from the cyclone cleaner 52 through the conduit 54 to a primary steam condenser 56 which uses either an air-cooled heat exchanger or an evaporative cooler, depending on local conditions. In the condenser 56, the steam stream is cooled to approximately 90° F. with over 90% of the incoming steam and mercury vapor being condensed. The condensate from the condenser 56 is transferred through the conduit 58 to a mercury trap 60 for separation of the mercury from the water. Cooled gases from the condenser 58 are transferred through the conduit 62 to a steam polishing condenser 64. A vacuum pump 66 (such as a roots-type blower) pulls a vacuum on the entire system through the polishing condenser 64 and the vacuum conduit 68. The exhaust of the vacuum pump 66 is transferred through the conduit 70 to an activated carbon filter 72 before being exhausted to the atmosphere.

The steam polishing condenser 64 is a small shell and tube condenser cooled by chilled water or direct expansion refrigerant supplied by a small packaged refrigeration unit 74. In the polishing condenser 64, the gas and condensate temperatures are lowered to a temperature in the range of from about 40° F. to about 60° F. thereby effectively condensing all remaining steam and mercury vapors and minimizing emissions through the exhaust of the vacuum pump 66. The condensate of the polishing condenser 64 is transferred to the mercury trap 60 through a conduit 76.

The mercury trap 60 is a gravimetric separator based on well known chevron or other baffle technology familiar to practitioner of the art. Such separators are known to separate mercury form water with an efficiency of at least 99%. Mercury is recovered directly from the trap 60 through a drain valve 78 at the completion of processing at each waste site.

Water from the trap 60 flows through a conduit 80 to a condensate tank 82 having a conical bottom to promote the further gravimetric separation of mercury from the other constituents of the condensate. Condensate stored in the condensate tank 82 is tested at the completion of processing at each site. Clean condensate is decanted from the condensate tank 82 for use as cooling water for the vacuum pump 66 and/or the primary steam condenser 56.

Mercury rich off-gas from the hot end (the second end 28) of the desorber 22 are transferred from the cyclone 48 through the conduit 84 to a mercury condenser 86. The mercury condenser 86 is another small shell and tube device cooled with chilled water or direct expansion refrigerant from a packaged refrigeration unit 88 (which could be the same unit as the chilled water unit 74). The incoming vapors, chiefly mercury and water vapor, are condensed at a temperature in the range of from about 40° F. and about 60° F. The resulting condensate is transferred through the conduit 90 to a second mercury trap 92. As with the polishing condenser 64, the mercury condenser 86 is connected to the vacuum pump 66 through the conduit 98. In the alternative, the mercury condenser 86 may be connected to its own, separate vacuum pump.

The second mercury trap 92 operates in the same manner as the first mercury trap 60. The mercury is removed from the trap 92 by the operation of the valve 94 and the water is transferred to the condensate tank 82 through the conduit 96.

The entire apparatus shown in FIGS. 1 and 2 is designed to fit on a mobile platform. Thus, the apparatus may be moved from site to site with a minimum of expense and disruption to the areas treated. Such a mobile platform is small enough to fit on a single flat bed truck for maximum mobility. Such a platform is easily and relatively inexpensively transportable by road, rail or air.

It can be seen that the present invention provides for a method and apparatus for removing mercury and mercury compounds from mercury-contaminated soils and industrial wastes. Further, the present invention provides such a system that reduces the mercury content of mercury-contaminated soils to a level no greater than the background level of mercury contained in the soil prior to the contamination. The present invention also reduces the leachable mercury content of mercury-containing industrial wastes to a level of less than about 0.2 ppm as measured by the standard EPA TCLP Leach Test, minimizes the content of gaseous sulfur compounds generated during the thermal treatment of mercury-contaminated soils and industrial wastes, and maximizes the amount of elemental mercury recovered during the thermal treatment of mercury-contaminated soils and industrial wastes. The present invention also provides a transportable means of thermally treating mercury-contaminated soils and industrial wastes such that the means may be economically and efficiently transported to various sites at which the mercury-contaminated soils and industrial wastes are located.

Having thus described various preferred embodiments of the invention and several of its benefits and advantages, it will be understood by those of ordinary skill that the foregoing description is merely for the purpose of illustration and that numerous substitutions, rearrangements and modifications may be made in the invention without departing from the scope and spirit of the appended claims.

The appended claims set forth various novel and useful features of the invention.

What is claimed is:

1. A method for the removal of mercury from soil, wherein the soil has been contaminated with mercury, the method comprising:
   (a) adding the soil to one end of an internally fired hollow screw desorber under a vacuum in the range of from about 15 inches of mercury to about 30 inches of mercury;
   (b) moving the soil from the one end of the internally fired hollow screw desorber to another end of the internally fired hollow screw desorber;
   (c) increasing the temperature of the soil in the internally fired hollow screw desorber as it moves from the one end of the internally fired hollow screw desorber to the other end of the internally fired hollow screw desorber, wherein the temperature of the soil is increased from a temperature in the range of from about ambient to about 150° F. to a temperature in the range of from about 1100° F. to about 1500° F.;
   (d) producing a mercury vapor in the internally fired hollow screw desorber;
   (d) removing the soil from the other end of the internally fired hollow screw desorber;
   (e) removing the mercury vapor from the internally fired hollow screw desorber; and
   (f) recovering mercury from the mercury vapor.

2. The method of claim 1 wherein the soil is added to the internally fired hollow screw desorber through an airlock valve.

3. The method of claim 1 wherein the soil is removed from the internally fired hollow screw desorber through an airlock valve.

4. The method of claim 1 wherein the step of recovering mercury from the mercury vapor further includes:
   (f1) passing the mercury vapor through a condenser at a temperature in the range of from about 40° F to about 60° F. producing a mercury-rich condensate;
   (f2) passing the mercury-rich condensate through a gravimetric mercury separator; and
   (f3) removing the mercury from the gravimetric mercury separator.

5. An apparatus for removing mercury from soil, wherein the soil has been contaminated with mercury, the apparatus comprising:
   (a) an internally fired hollow screw desorber further including:
      (a1) an external casing having a first end and a second end opposite the first end, and having a closed shell connecting the first end and the second end, wherein the external casing is capable of sustaining an internal vacuum in the range of from about 15 inches of mercury to about 30 inches of mercury;
      (a2) a hollow spindle mounted axial to the external casing, running from the first end to the second end of the external casing;
      (a3) a burner providing a flame into the hollow spindle adjacent the second end of the external casing wherein the flame travels at least a portion of the length of the hollow spindle;
      (a4) a screw transport mechanism mounted to the hollow spindle internal to and axial to the external casing, the screw transport mechanism for transporting soil from the first end to the second end;

(a5) a first airlock valve in the external casing adjacent the first end for passing soil from outside the external casing to inside the external casing, the first airlock valve being capable of passing the soil without substantial loss of vacuum inside the external casing; and (a6) a second airlock valve in the external casing adjacent the second end for passing soil from inside the external casing to outside the external casing, the second airlock valve being capable of passing the soil without substantial loss of vacuum inside the external casing;

(a7) a vapor port adjacent the second end of the external casing for removing vapors from the interior of the external casing;

(b) a condenser for condensing materials from the vapors removed from the interior of the exterior casing of the internally fired hollow screw desorber;

(c) a first conduit for transferring the vapors removed from the interior of the exterior casing of the internally fired hollow screw desorber to the condenser;

(d) a trap for separating the mercury from the condensed materials condensed in the condenser;

(e) a second conduit for transferring the condensed material from the condenser to the trap; and (f) a mobile platform for bearing the desorber, the condenser, the first conduit, the trap, and the second conduit, such that the mobile platform bears the desorber, the condenser, the first conduit, the trap, and the second conduit in a manner such that they are capable of acting in concert to remove mercury from the soil.

6. The apparatus of claim 5 wherein the internally fired hollow screw desorber further includes a second vapor port between the first airlock valve and the vapor port for removing vapors from the desorber.

7. The apparatus of claim 6 wherein the apparatus further includes a second condenser for condensing steam vapor from the desorber, and a third conduit for transporting the steam vapor from the second vapor port to the second condenser.

\* \* \* \* \*